United States Patent
Shukh et al.

(10) Patent No.: US 6,704,176 B2
(45) Date of Patent: Mar. 9, 2004

(54) SPIN VALVE SENSOR

(75) Inventors: Alexander M. Shukh, Savage, MN (US); Dimitar V. Dimitrov, Edina, MN (US); Sining Mao, Savage, MN (US); Ananth Naman, Sunnyvale, CA (US); Philip A. Seekell, Goffstown, NH (US); Erli Chen, Roseville, MN (US); Lujun Chen, West Hills, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 94 days.

(21) Appl. No.: 10/010,080

(22) Filed: Nov. 13, 2001

(65) Prior Publication Data

US 2003/0090843 A1 May 15, 2003

(51) Int. Cl.[7] .................................................. G11B 5/39
(52) U.S. Cl. .................................................. 360/324.12
(58) Field of Search ......................... 360/324.1, 324.11, 360/324.12

(56) References Cited

U.S. PATENT DOCUMENTS 5,923,503 A * 7/1999 Sato et al. ................ 360/327
6,266,218 B1 * 7/2001 Carey et al. ........... 360/324.12
6,459,551 B1 * 10/2002 Hayakawa ................ 360/313
2001/0005300 A1 * 6/2001 Hayashi .................... 360/317
2002/0008949 A1 * 1/2002 Ito et al. ................ 360/324.12
2002/0097540 A1 * 7/2002 Hayashi et al. ........ 360/324.12
2002/0167767 A1 * 11/2002 Jayasekara ............... 360/324.2

FOREIGN PATENT DOCUMENTS

| JP | 07254114 A | * | 10/1995 | ............ G11B/5/39 |
| JP | 08221717 A | * | 8/1996 | ............ G11B/5/39 |
| JP | 10284769 A | * | 10/1998 | ............ H01L/43/08 |
| JP | 2000200404 A | * | 7/2000 | ............ G11B/5/39 |
| JP | 2001067626 A | * | 3/2001 | ............ G11B/5/39 |
| JP | 2002329905 A | * | 11/2002 | ............ H01L/43/08 |

* cited by examiner

*Primary Examiner*—William Klimowicz
(74) *Attorney, Agent, or Firm*—Westman, Champlin & Kelly

(57) ABSTRACT

A spin valve sensor for use with a data storage system includes free and pinned ferromagnetic (FM) layers, a conducting layer therebetween, contact leads, free layer biasing elements, and an anti-ferromagnetic (AFM) layer. The pinned layer has opposing ends, which define a width of an active region of the spin valve sensor having a giant magnetoresistive effect in response to applied magnetic fields. The free layer is positioned below the pinned layer and has opposing ends that extend beyond the active region. The contact leads abut the pinned layer and overlay portions of the conducting layer. The free layer biasing elements abut the ends of the free layer and bias a magnetization of the free layer in a longitudinal direction.

15 Claims, 6 Drawing Sheets

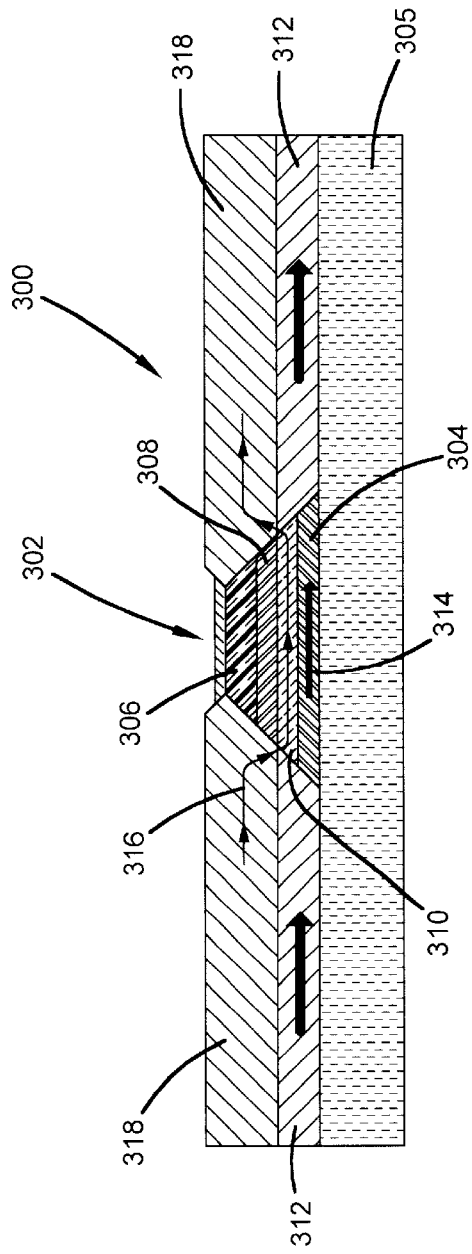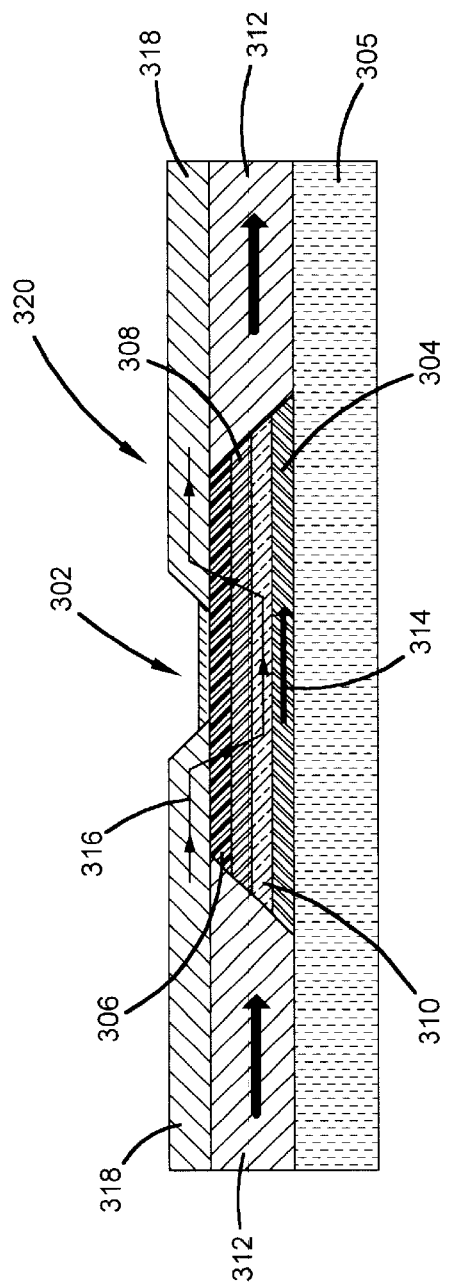

SPIN VALVE SENSOR

FIELD OF THE INVENTION

The present invention relates to disc drive storage systems. More particularly, the present invention relates to spin valve sensors for use in disc drive storage systems.

BACKGROUND OF THE INVENTION

Disc drives are the primary devices employed for mass storage of computer programs and data used in computer systems. Disc drives typically use rigid discs, which are coated with a magnetizable medium for storage of digital information in a plurality of circular, concentric data tracks. A read/write head is adapted to read information from and write information to the data tracks.

The head is carried by a slider which is connected to an actuator mechanism through a gimbaled attachment. The actuator mechanism moves the slider from track-to-track across the surface of the disc under control of electronic circuitry. The actuator mechanism includes a suspension assembly that applies a load force to the slider to urge the slider toward the disc. As the disc rotates, air is dragged and compressed under bearing surfaces of the slider that create a hydrodynamic lifting force which counteracts the load force and causes the slider to lift and "fly" in close proximity to the disc surface. The gimbaled attachment between the slider and the suspension assembly allows the slider to pitch and roll as it follows the typography of the disc.

Giant magnetoresistive (GMR) sensors are used as read elements in read/write heads to read data recorded on the magnetic discs of the disc drive. The data are recorded as magnetic domains in the recording medium. As the data moves past an active region of the read element, the data causes changes in magnetic flux to the GMR sensor, which causes changes in the electrical impedance of the GMR sensor. A signal representing these impedance changes and, thus, the recorded data, is obtained by applying a bias or sense current through the sensor. Decoding circuitry is used to analyze the signal and retrieve the data. Typical read sensors utilizing the GMR effect, frequently referred to as "spin valve" sensors, are known in the art. These spin valve sensors are multi-layered structures consisting of two ferromagnetic (FM) layers separated by a thin non-ferromagnetic layer. One of the ferromagnetic layers is called the "pinned layer" because its magnetization is magnetically pinned or oriented in a fixed and unchanging direction by an adjacent anti-ferromagnetic (AFM) layer, commonly referred to as the "pinning layer," through an anti-ferromagnetic exchange coupling. The other ferromagnetic layer is called the "free" or "unpinned" layer because its magnetization is allowed to rotate in response to the presence of external magnetic fields. The impedance of the spin valve varies as a function of the angle between the magnetization of the free layer and the magnetization of the pinned layer thereby producing the GMR effect. Contact layers are attached to the spin valve sensor to apply the sense current and obtain the signal from which the recorded data is obtained.

There is a never-ending demand for higher data storage capacity in disc drives. One measure of the data storage capacity is the areal density of the bits at which the disc drive is capable of reading and writing. The areal density is generally defined as the number of bits per unit length along a track (linear density and units of bits per inch) multiplied by the number of tracks available per unit length in the radial direction of the disc (track density in units of track per inch or TPI). Currently, there is a need for areal densities on the order of 100 Gb/in$_2$ which requires a track density on the order of 100–150 kTPI and greater.

One way to increase areal density of the data stored on a disc is to increase the track density by decreasing the track width and spacing between tracks. The smaller track widths and spacing require read elements with decreased active region widths and increased sensitivity to changing magnetic fields within the active region while avoiding side-reading. Side-reading occurs when a magnetic head responds to changing magnetic fields produced by adjacent tracks. This side-reading is a source of noise in the recovered data signal, and a source of cross-talk, a phenomenon where the read element reads data from two or more adjacent tracks. Consequently, the effects of side-reading in a read head is a limiting factor on the spacing between adjacent tracks, and hence a limiting factor to increased areal density.

The prior art teaches that in order for a GMR element to operate optimally, a longitudinal bias field should be applied to the free layer. The longitudinal bias field extends parallel to the surface of the recording media and parallel to the lengthwise direction of the GMR element. The function of the longitudinal bias field is to suppress Barkhausen noise which originates from multi-domain activities in the free layer of the GMR element. However, while it is important that the longitudinal bias field be strong enough to suppress the multi-domain activities in the free layer, it is also important for high areal density recordings that the longitudinal bias field be weak enough to allow the magnetization of the free layer to remain sensitive to external magnetic fields in the active region of the sensor.

Currently, two main longitudinal bias schemes for stabilization of the free layer are widely used. One scheme is based on the formation of a continuous free layer with end regions, which are longitudinally biased through an exchange coupling with adjoining anti-ferromagnetic patterns. The active region of the free layer is maintained in the desired single domain state due to the longitudinal bias field generated at the end regions of the free layer. In this scheme, the width of the active region of the free layer is primarily defined by the spacing of the conductor leads. Examples of such longitudinal bias schemes are described in U.S. Pat. Nos. 4,663,685 and 5,206,590. Although spin valve sensors with this type of longitudinal bias scheme exhibit satisfactory magnetic stability and sensitivity, they have relatively low track resolution due to side-reading at overlaid and regions of the free layer.

Another longitudinal biasing scheme is provided using permanent magnets which form abutted junctions to ends of the spin valve stack. In this scheme, the active region of the spin valve sensor is defined by the spacing between the abutted junctions. An example of a spin valve sensor using this longitudinal biasing scheme is described in U.S. Pat. No. 5,742,162 and is generally illustrated in FIG. 1. The spin valve sensor 300 includes a sensor stack 302 that includes a ferromagnetic free layer 304 formed on an insulating layer 305, and AFM layer 306 that pins a magnetization of ferromagnetic pinned layer 308, and a conducting layer 310. Permanent magnets 312 form abutted junctions to ends of the sensor stack and longitudinally bias the magnetization 314 in free layer 304. A sense current 316 is delivered through the conducting layer 310 from conductor leads 318 which form abutted junctions to the ends of the spin valve stack 302. The width of the active region of the spin valve sensor 300 is generally defined by the spacing between the permanent magnets 312 and the conductor leads 318. The longitudinal bias field produced by the permanent magnets 312 is strong over the width of the active region resulting in enhanced track resolution but low sensitivity to external magnetic fields applied to the active region of the sensor.

It is known that the sensitivity of spin valve sensors having permanent magnets that form abutted junctions with the sensor stack can be enhanced by utilizing conductor leads that overlay the sensor stack as shown in the spin valve sensor 320 of FIG. 2. Spin valve sensor 320 generally includes the same elements of sensor 300 of FIG. 1, but with the modification of permanent magnets 312 forming an abutted junction with the entire sensor stack 302 while conductor leads 318 overlay end regions of the sensor stack. For a given active region width, the spin valve sensor 320 with overlay conductor leads 318 has better sensitivity than spin valve sensor 300 with conductor leads 318 forming abutted junctions with the sensor stack 302, due to greater spacing between permanent magnets 312 and the center of the ferromagnetic free layer 304. The larger separation results in a reduction of the magnitude of the longitudinal bias field generated by permanent magnets 312 in the center of ferromagnetic free layer 304 and increases the permeability of ferromagnetic free layer 304 in the central active region of sensor 320, on which the sensitivity of the sensor depends. However, spin valve sensors with these spaced permanent magnet abutting junctions and overlay conductor leads have lower track resolution than sensors having permanent magnets and conductor leads forming abutted junctions with the sensor stack, due to the much higher permeability of the portions of the free layer which are overlaid by the conductor leads. This results in undesirable oscillations of the magnetization in the overlaid regions of the free layer. Additionally, the conductor leads have a resistivity, which causes the sense current 316 to flow through the spin valve stack 302 under the overlaid portions resulting in increased side-reading problems.

There exists a continuing demand for increased areal densities in magnetic data storage systems. To accommodate this demand, advancements in GMR sensor designs are required in the areas of reducing side-reading while improving sensitivity to applied magnetic fields.

SUMMARY OF THE INVENTION

The present invention is directed to a spin valve sensor for use with a data storage system having high sensitivity while avoiding problems with side-reading and cross-talk. The spin valve sensor includes free and pinned ferromagnetic (FM) layers, a conducting layer therebetween, contact leads, free layer biasing elements, and an anti-ferromagnetic (AFM) layer. The pinned layer has opposing ends, which define a width of an active region of the spin valve sensor having a giant magnetoresistive effect in response to applied magnetic fields. The free layer is positioned below the pinned layer and has opposing ends that extend beyond the active region. The contact leads abut the pinned layer and overlay portions of the conducting layer. The free layer biasing elements abut the ends of the free layer and bias the magnetization of the free layer in a longitudinal direction.

These and other features and benefits would become apparent with a careful review of the following drawings and the corresponding detailed description.

BRIEF DESCRIPTION OF THE DRAWINGS

FIGS. 1 and 2 show cross-sectional views of spin valve sensors in accordance with the prior art.

DETAILED DESCRIPTION OF ILLUSTRATIVE EMBODIMENTS

Figure 3:
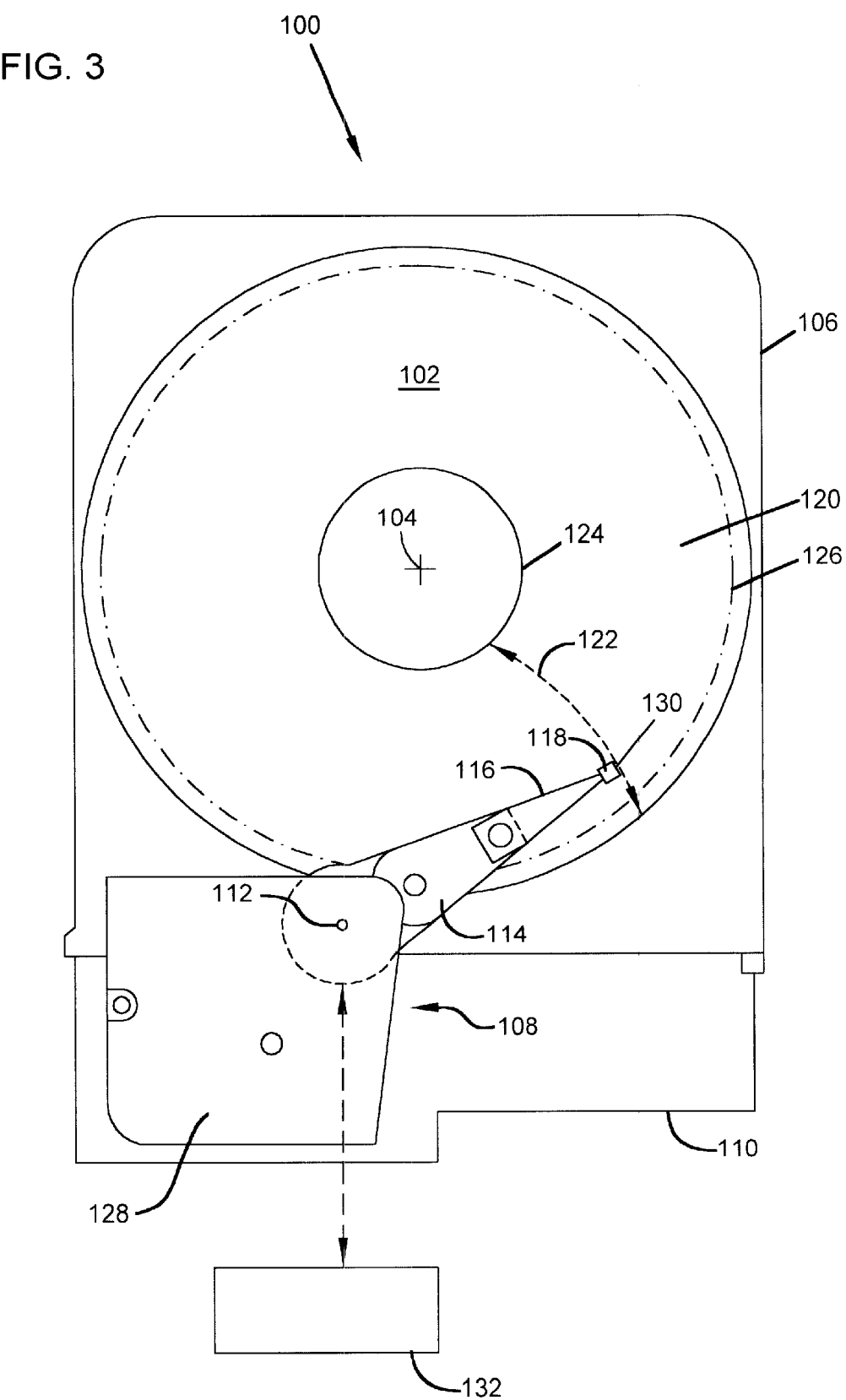
FIG. 3 is a top view of a disc drive storage system with which embodiments of the present invention may be used.

FIG. 3 is a top view of a disc drive 100, with which embodiments of the present invention may be used. Disc drive 100 includes a magnetic disc 102 mounted for rotational movement about an axis 104 and driven by a spindle motor (not shown). The components of disc drive 100 are contained within a housing that includes a base 106 and a cover (not shown). Disc drive 100 also includes an actuator 108 mounted to a base plate 110 and pivotally moveable relative to disc 104 about axis 112. Actuator mechanism 108, includes actuator arm 114 and suspension assembly 116. Slider 118 is coupled to suspension assembly 116 through a gimbaled attachment that allows slider 118 to pitch and roll as it rides on an air bearing above surface 120 of disc 102. Actuator mechanism 108 is adapted to rotate slider 118 on arcuate path 122 between an inner diameter 124 and an outer diameter 126 of disc 102. A cover 128 can cover a portion of actuator mechanism 108. Slider 118 supports a head 130 having separate read and write transducing elements for reading information from and writing information to disc 102.

During operation, as disc 102 rotates, air (and/or a lubricant) is dragged under air bearing surfaces of slider 118 in a direction approximately parallel to the tangential velocity of disc 102. As the air passes beneath the bearing surfaces, air compression along the airflow path causes the air pressure between disc surface 120 and the bearing surfaces to increase, which creates a hydrodynamic lifting force that counteracts a load force provided by suspension 116 and causes slider 118 to "fly" above and in close proximity to disc surface 120.

Drive controller 132 controls actuator mechanism 108 through a suitable connection. Drive controller 132 can be mounted within disc drive 100 or located outside of disc drive 100. During operation, drive controller 132 receives position information indicating a portion of disc 102 to be accessed. Drive controller 132 receives the position information from an operator, from a host computer, or from another suitable controller. Based on the position information, drive controller 132 provides a position signal to actuator mechanism 108. The position signal causes actuator mechanism 108 to pivot about axis 112. This, in turn, causes the slider 118 and the head 130 it is supporting to move radially over disc surface 120 along path 122. Once head 130 is appropriately positioned, drive controller 132 then executes a desired read or write operation.

Figure 4:
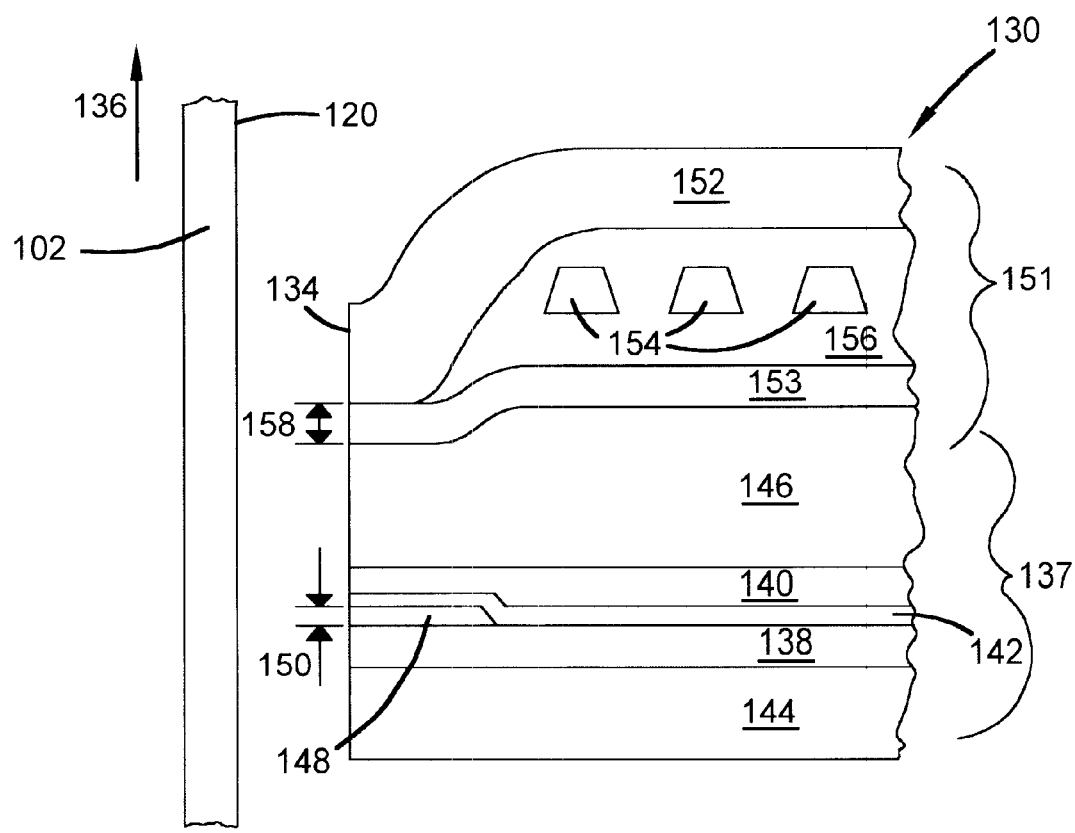
FIG. 4 is a cross-sectional view of a magnetic read/write head and a magnetic disc taken along a plane that is normal to an air bearing surface of the read/write head.

FIG. 4 is a cross-sectional view of an example of a read/write head 130 and magnetic disc 102 taken along a plane that is normal to an air bearing surface 134 of head 130. Air bearing surface 134 of head 130 faces disc surface 120 of magnetic disc 102. Magnetic disc 102 travels or rotates in a direction relative to magnetic head 130 as indicated by arrow 136. The spacing between air bearing surface 134 and disc surface 120 is preferably minimized while avoiding contact between head 130 and magnetic disc 102.

A read portion 137 of head 130 includes a bottom gap layer 138, a top gap layer 140, a metal contact layer 142, a bottom shield 144, a top shield 146, and a read element 148. Read gap 150 is defined on air bearing surface 134 between bottom gap layer 138 and metal contact layer 142. Metal contact layer 142 is positioned between bottom gap layer 138 and top gap layer 140. Read element 148 is positioned between bottom and top shield 144 and 146 at terminating ends of bottom gap layer 138 and metal contact layer 142. Bottom and top shields 144 and 146 operate to isolate read element 148 from external magnetic fields that could affect its sensing of the magnetic moments recorded on disc 102 that are immediately below read element 148.

A write portion 151 of head 130 includes top shield 146, a top pole 152, a write gap layer 153, a conductive coil 154, and insulating material 156. Write gap 158 is defined on air bearing surface 134 by write gap layer 153 between terminating ends of top pole 152 and top shield 146. In addition to acting as a shield, top shield 146 also functions as a shared pole for use in conjunction with top pole 152. Electrically conductive coils 154 are provided to generate magnetic fields across write gap 158 and are positioned in insulating material 156 between top pole 152 and write gap layer 153. Although FIG. 4 shows a single layer of conductive coils 154, it is understood in the art that several layers of conductive coils separated by insulating layers may be used. Furthermore, it should be understood that head 130 is one example of a head with which the various embodiments of the present invention may be used.

Figure 5:
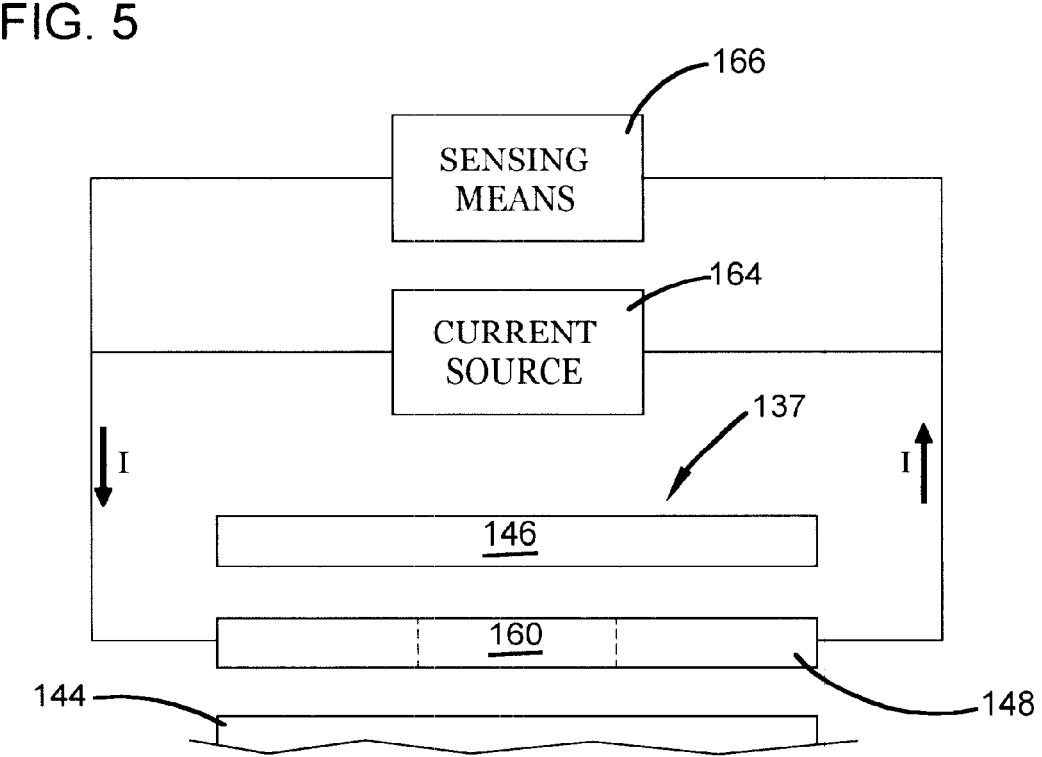
FIG. 5 is a simplified layered diagram of magnetically significant elements of a read portion of a head as they appear along an air bearing surface.

FIG. 5 is a simplified layered diagram of a read portion 137 of head 130, which illustrates the location of a plurality of magnetically significant elements of the read portion 137 as they appear along air bearing surface 134 of head 130 shown in FIG. 4. In FIG. 5, all spacing and insulating layers are omitted for clarity. Bottom shield 144 and top shield 146 are spaced to provide room for read element 148 therebetween. An active region 160 of read element 148 defines a read sensor in which the GMR effect takes place in response to applied magnetic fields and defines a read sensor width. In operation, a sense current I is generated by a current source 164, which is directed through conductor leads of sensor 148. Resistance changes in the active region 160 of sensor 148 due to the GMR effect are sensed by measuring a voltage drop across sensor 148 using a sensing means 166 in accordance with known methods. Read circuitry (not shown) deciphers the sensed resistance changes to determine the data stored on the recording medium.

Figure 6:
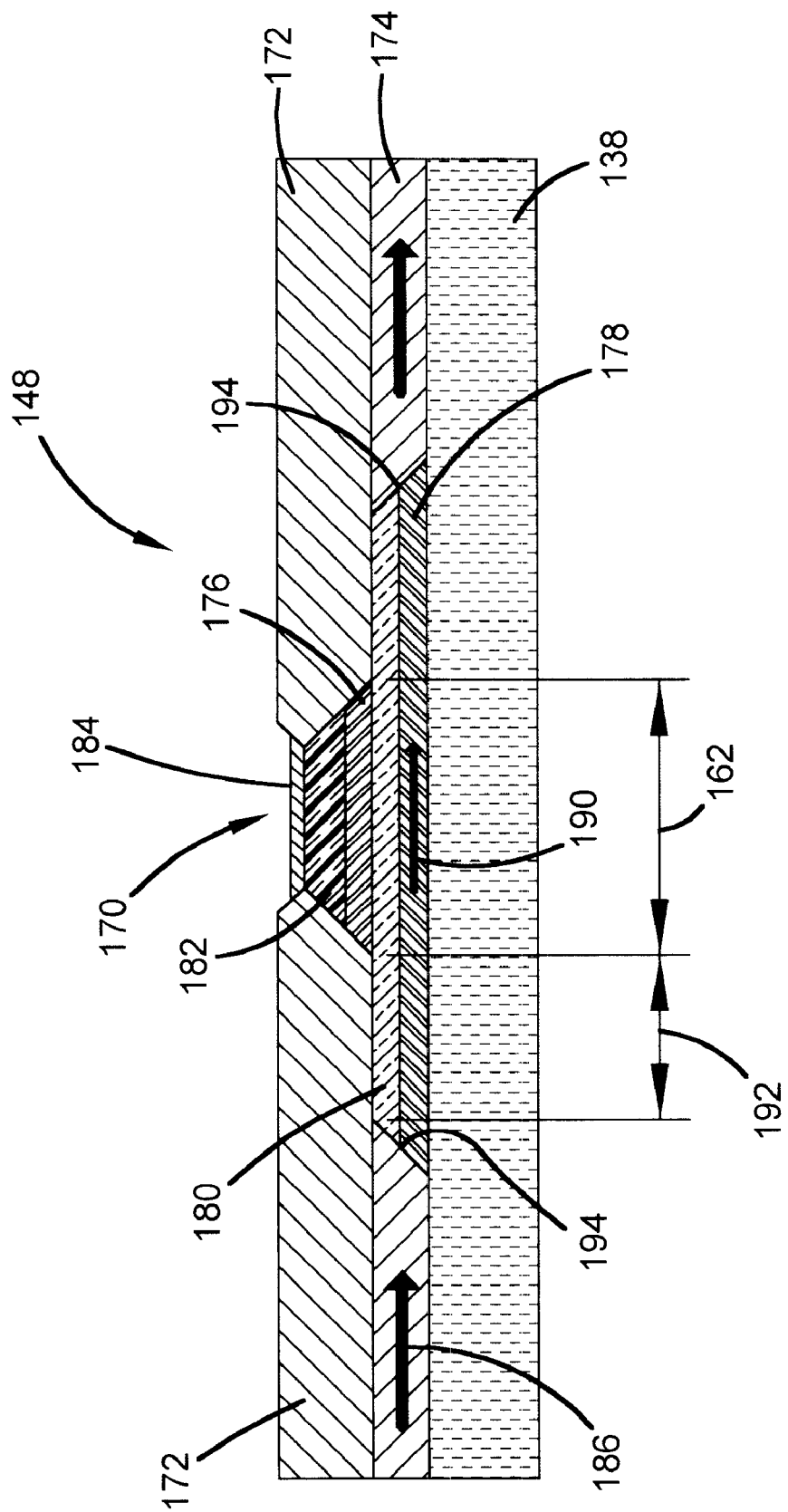
FIGS. 6–7 show cross-sectional views of read elements or spin valve sensors in accordance with various embodiments of the invention.
Figure 7:
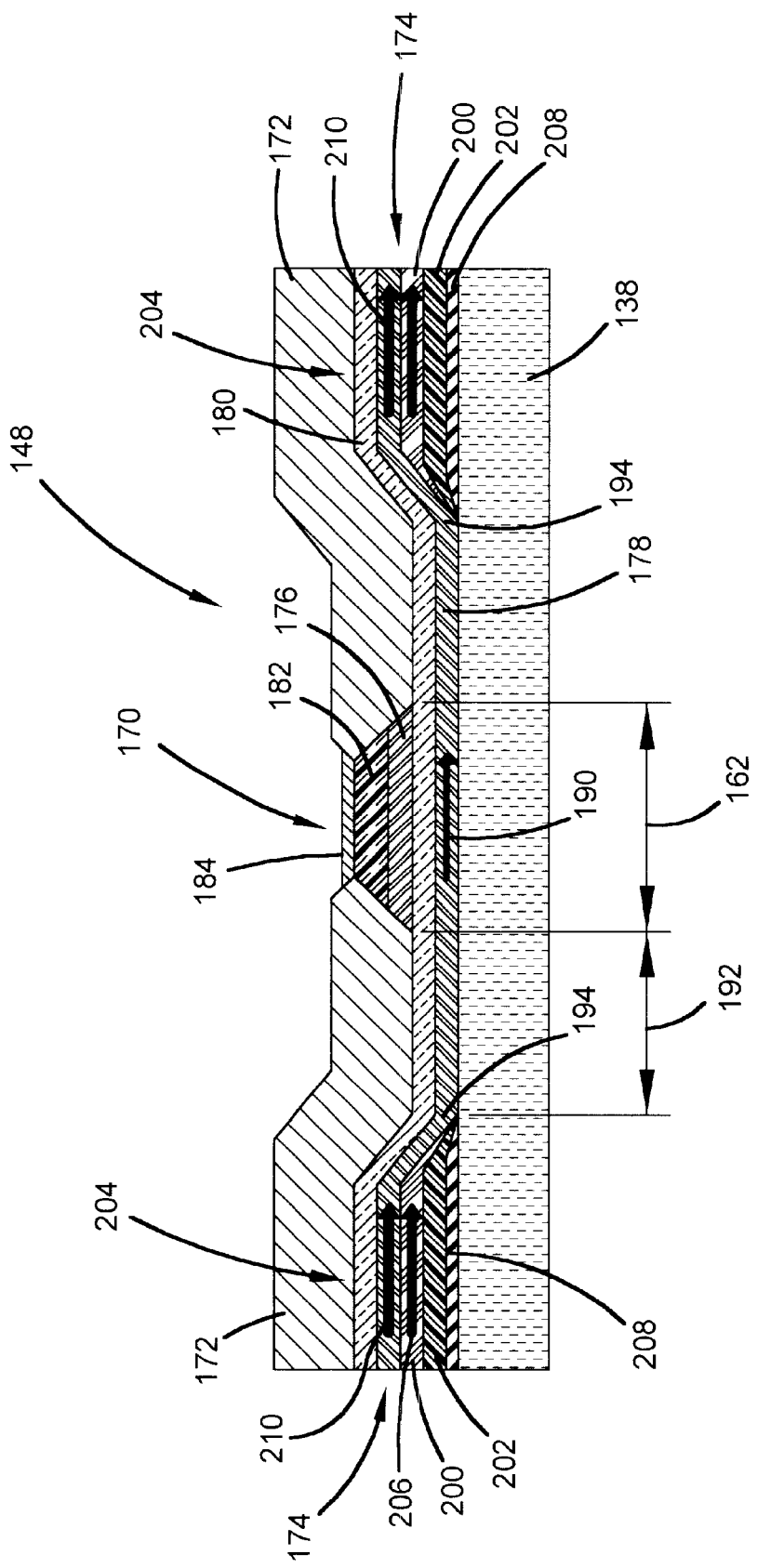

FIGS. 6–7 show read elements or spin valve sensors, generally designated as 148, in accordance with various embodiments of the invention, which provide improved sensitivity over read elements of the prior art while avoiding problems with side-reading and cross-talk. In general, sensor 148 is formed on a magnetic insulating layer 138 and includes a sensor stack 170, contact leads 172, and free layer biasing elements 174. Sensor stack 170 includes ferromagnetic (FM) pinned and free layers 176 and 178 respectively, a conducting layer 180, and an anti-ferromagnetic (AFM) layer 182. A protective cap 184 can also be formed on sensor stack 170. Free layer 178 is longitudinally biased by a magnetic field (represented by arrow 186) generated by the free layer biasing elements 174 such that free layer 178 is substantially in a single domain state and the magnetization (represented by arrow 190) in free layer 178 is oriented in a longitudinal direction when in a quiescent state. An orientation of the magnetization in pinned layer 176 is fixed in a direction that is preferably orthogonal to magnetization 190 in free layer 178 by exchange coupling with AFM layer 182 in accordance with known methods.

Conventional materials are used to form the various layers of the sensor stack 170. For example, copper (Cu) can be used to form conducting layer 180 and contact leads 172; nickel-iron (NiFe), cobalt-iron (CoFe), or other iron alloys can be used to form the pinned and free layers 176 and 178; and nickel-manganese (NiMn), iridium-manganese (IrMn), nickel-oxide (NiO) and other manganese alloys can be used to form AFM layer 182. Other materials can also be used to form the various components of sensor stack 170. Additionally, the components of sensor 148 are formed in accordance with conventional processing techniques.

Free layer 178 and conducting layer 180 are continuous layers that include end regions 194 that extend beyond the active region defined by width 162. In accordance with one embodiment, free layer biasing elements 174 are permanent magnets that abut end regions 194 of conducting and free layers 180 and 178, as shown in FIG. 6.

In accordance with another embodiment of the invention, shown in FIG. 7, free layer biasing elements 174 are multi-layered structures that provide the desired biasing of magnetization 190 in free layer 178 in the longitudinal direction. In this embodiment, free layer biasing elements 174 include cooperating FM and AFM portions 200 and 202, respectively, which underlay an end portion 204 of free layer 178. A magnetization orientation in FM portion 200, represented by arrow 206, is pinned in the longitudinal direction by AFM portion 202 through exchange coupling therebetween. To enhance antiferromagnetic exchange coupling between FM and AFM portions 200 and 202, respectively, the AFM portion 202 is deposited on seed layer 208. This exchange coupling, in turn, pins a magnetization 210 in end portions 204 of free layer 178 in the longitudinal direction and generates a longitudinal bias field that orients magnetization 190 of free layer 178 in the longitudinal direction when in a quiescent state.

AFM portion 202 is preferably formed of a material having a higher blocking temperature than the material forming AFM layer 182 to allow the exchange coupling between AFM portion 202 and FM portion 200 to be set separately from the setting of the exchange coupling between AFM layer 182 and pinned layer 176. Accordingly, AFM portion 202 can be formed of a nickel-manganese (NiMn) alloy or other manganese alloys having a high blocking temperature and AFM layer 182 of sensor sack 170 can be formed of an iridium-manganese (IrMn) alloy or other AFM materials which do not require a high temperature anneal to initiate exchange coupling with pinned layer 176. Seed layer 208 can be made of a thin layer of nickel-iron (NiFe), a dual layer structure of tantalum and nickel-iron with the nickel-iron layer positioned adjacent AFM portion 202.

Sensor 148 can be used to read magnetic information recorded at a very high areal density due to its high sensitivity and narrow active region width. The width 162 of the active region is substantially defined by the spacing of the contact leads 172 and the portion of sensor stack 170 where the free and pinned layers 178 and 176 overlap. The width 162 of the active region can be made very small due to the reduced demagnetizing field in the pinned layer 176. Additionally, the sensitivity of sensor stack 170 to applied magnetic fields is high due to the spacing of the free layer biasing elements 174 from the active region. Accordingly, sensor 148 is ideal for use with high areal density recordings.

In summary, the present invention relates to a spin valve sensor (such as 148) for use with a data storage system (such as 100) which utilizes a giant magnetoresistive effect in response to applied magnetic fields to read information recorded on a magnetic disc (such as 102). In accordance with one embodiment of the invention, the spin valve sensor includes a ferromagnetic pinned layer (such as 176), a ferromagnetic free layer (such as 178), a conducting layer (such as 180), contact leads (such as 172), free layer biasing elements (such as 174), and an anti-ferromagnetic layer (such as 182). The pinned layer has opposing ends, which define a width (such as 162) of an active region. The anti-ferromagnetic layer is positioned adjacent the pinned layer and is adapted to pin a magnetization of the pinned layer in a desired direction. The free layer is positioned below the pinned layer and has opposing ends (such as 194) that extend beyond the active region. The conducting layer is positioned between the free and pinned layers. The contact leads abut the pinned layer and overlay portions of the conducting layer.

The free layer biasing elements are positioned adjacent the ends of the free layer and are adapted to bias a magnetization (such as 190) in the free layer in a longitudinal direction (such as 186). In one embodiment, the free layer biasing elements are permanent magnets. In another embodiment, the free layer biasing elements each include cooperating FM and AFM portions (such as 200 and 202) underlying an end portion (such as 204) of the free layer. The FM portion includes a magnetization (such as 206) that is pinned in the longitudinal direction by the AFM portion through exchange coupling.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A spin valve sensor comprising:
    a ferromagnetic (FM) pinned layer having opposing ends, which define a width of an active region;
    an FM free layer positioned below the pinned layer and having opposing ends that extend beyond the active region;
    a conducting layer between the pinned and free layers;
    contact leads abutting the pinned layer and overlaying end portions of the conducting layer;
    free layer biasing elements that abut the ends of the free layer and bias a magnetization of the free layer in a longitudinal direction; and
    an anti-ferromagnetic (AFM) layer adjacent the pinned layer and adapted to pin the magnetization of the pinned layer.

2. The sensor of claim 1, wherein the free layer biasing elements are permanent magnets.

3. The sensor of claim 1, wherein the free layer biasing elements each include cooperating FM and AFM portions underlying an end portion of the free layer, the FM portion includes a magnetization that is pinned in the longitudinal direction by the AFM portion through exchange coupling.

4. The sensor of claim 3 wherein the AFM portions of the free layer biasing elements are formed on a seed layer.

5. The sensor of claim 3, wherein the AFM portions are formed of a material having a higher blocking temperature than a material forming the AFM layer.

6. The sensor of claim 5, wherein the AFM layer is formed of nickel-manganese (MiMn) or platinum-manganese (Pt-Mn), and the AFM portions are formed of iridium-manganese (IrMn) or nickel oxide (NiO).

7. The sensor of claim 1, wherein the conducting layer is formed of copper (Cu) or silver (Ag).

8. The sensor of claim 1, wherein the free and pinned layers are formed of at least one material selected from a group consisting of cobalt-iron (CoFe) and nickel-iron (NiFe).

9. The sensor of claim 1, including a protective cap layer formed over the AFM layer.

10. A disc drive storage system including the sensor of claim 1.

11. A spin valve sensor comprising:
    a ferromagnetic (FM) pinned layer having opposing ends, which define a width of an active region;
    an FM free layer positioned below the pinned layer and having opposing ends that extend beyond the active region;
    a conducting layer between the pinned and free layers;
    contact leads abutting the pinned layer and overlaying end portions of the conducting layer;
    permanent magnets that abut the ends of the free layer and bias a magnetization of the free layer a longitudinal direction; and
    an anti-ferromagnetic (AEM) layer adjacent the pinned layer and adapted to pin the magnetization of the pinned layer.

12. The sensor of claim 11, wherein the conducting layer is formed of copper (Cu) or silver (Ag).

13. The sensor of claim 11, wherein the free and pinned layers are formed of at least one material selected from a group consisting of cobalt-iron (CoFe) and nickel-iron (NiFe).

14. The sensor of claim 11, including a protective cap layer formed over the AFM layer.

15. A disc drive storage system including the sensor of claim 11.

\* \* \* \* \*

UNITED STATES PATENT AND TRADEMARK OFFICE
CERTIFICATE OF CORRECTION

PATENT NO. : 6,704,176 B2
DATED : March 9, 2004
INVENTOR(S) : Alexander M. Shukh et al.

It is certified that error appears in the above-identified patent and that said Letters Patent is hereby corrected as shown below:

Title page,
Item [56], References Cited, U.S. PATENT DOCUMENTS, insert:
-- 4,663,685    5/1987     Tsang            360/113
5,018,037    5/1991     Krounbi et al.   360/113
5,206,590    4/1993     Dieny et al.     324/252
5,475,550    12/1995    George           360/113
5,528,440    6/1996     Fontana et al.   360/113
5,742,162    4/1998     Nepela           324/252 --

Column 8,
Line 42, cancel "(AEM)" and insert -- (AFM) --

Signed and Sealed this

Twentieth Day of July, 2004

JON W. DUDAS
*Acting Director of the United States Patent and Trademark Office*